United States Patent [19]
Choenchom

[11] Patent Number: 5,456,208
[45] Date of Patent: Oct. 10, 1995

[54] ANIMAL CAGE SHELF PAW PROTECTORS

[76] Inventor: Margaret E. Choenchom, 2802 Dowe Ave., Union City, Calif. 94587-3159

[21] Appl. No.: 260,466

[22] Filed: Jun. 14, 1994

[51] Int. Cl.$^6$ ..................................................... A01K 1/00
[52] U.S. Cl. ............................................................ 119/17
[58] Field of Search ........................... 119/17, 15, 19; 108/157, 159, 161, 51.1, 901

[56] References Cited

U.S. PATENT DOCUMENTS

| | | | |
|---|---|---|---|
| 3,088,619 | 5/1963 | Boucher | 108/58.1 X |
| 3,157,136 | 11/1964 | Moody | 108/157 X |
| 3,707,929 | 1/1973 | Lauffer | 108/51.1 |
| 3,915,098 | 10/1975 | Nania | 108/51.1 |
| 4,706,424 | 11/1987 | Garapick et al. | 108/51.1 X |
| 5,123,359 | 6/1992 | DelBalso | 108/51.1 |

*Primary Examiner*—Gene Mancene
*Assistant Examiner*—Thomas Price

[57] ABSTRACT

An animal cage shelf paw protector is adapted to be used in association with an animal cage of the type having a horizontal floor and four vertical sidewalls. The sidewalls consist of a plurality of vertical and horizontal bars positioned adjacent to each other and forming spaces therebetween. The floor is formed in a generally planar rectangular configuration and is positioned horizontally with the vertical sidewalls coupled thereupon. The cage includes a horizontally positioned shelf which extends from one sidewall to another. Each shelf consists of a plurality of intersecting rods. The improvement comprises an animal cage shelf paw protector fabricated of plastic and formed as a generally planar rectangular shaped panel. The panel has parallel long side edges and parallel short side edges. The panel includes an upper surface and a lower surface and is positioned horizontally in the operative orientation. The lower surface includes two generally planar legs affixed thereto. The paw protectors are adapted to be positioned upon the shelf of the cage with the legs extending between the rods to prevent movement of the apparatus.

1 Claim, 4 Drawing Sheets

ANIMAL CAGE SHELF PAW PROTECTORS

BACKGROUND OF THE INVENTION

1. Field of the Invention

The present invention relates to animal cage shelf paw protectors and more particularly pertains to protecting the paws of small animals by positioning the apparatus on top of the wire shelves of animal cages.

2. Description of the Prior Art

The use of cages for birds, reptiles and other small animals is known in the prior art. More specifically, cages for birds, reptiles and other small animals heretofore devised and utilized for the purpose of providing housing and recreational activities for small animals are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,163,381 to Kraski a pet play pen.

U.S. Pat. No. 5,078,094 to Hoover discloses an elevator toy for small animals.

U.S. Pat. No. 5,003,922 to Niki discloses a cage for small experimental animals.

U.S. Pat. No. 4,909,188 to Tominaga discloses a cage for keeping pet animals.

Lastly, U.S. Pat. No. 3,958,534 to Perkins discloses an animal cage.

In this respect, the animal cage shelf paw protectors according to the present invention substantially depart from the conventional concepts and designs of the prior art, and in doing so provide an apparatus primarily developed for the purpose of protecting the paws of small animals by positioning the apparatus on top of the wire shelves of animal cages.

Therefore, it can be appreciated that there exists a continuing need for new and improved animal cage shelf paw protectors which can be used for protecting the paws of small animals by positioning the apparatus on top of the wire shelves of animal cages. In this regard, the present invention substantially fulfills this need.

SUMMARY OF THE INVENTION

In view of the foregoing disadvantages inherent in the known types of cages for birds, reptiles and other small animals now present in the prior art, the present invention provides an improved animal cage shelf paw protectors. As such, the general purpose of the present invention, which will be described subsequently in greater detail, is to provide a new and improved animal cage shelf paw protectors and method which has all the advantages of the prior art and none of the disadvantages.

To attain this, the present invention essentially comprises a new and improved animal cage shelf paw protector for use in association with an animal cage of the type having a horizontal floor and four vertical sidewalls. The cage includes two opposing sidewalls having a long horizontal width and two opposing sidewalls having a short horizontal width. The sidewalls consist of a plurality of equidistantly spaced, vertically and horizontally positioned bars. The bars are formed in a long thin cylindrical configuration. The horizontal bars are affixed to the vertical bars so as to form the boundaries of a plurality of small, generally rectangular shaped aperture. The apertures are small enough to prevent the passage of a small animal therethrough. The floor is positioned horizontally and formed in a generally planar rectangular configuration with short vertical side plates extending upward from its side edges. The vertical sidewalls are releasably coupled upon the uppermost extent of the side plates of the floor in the operative orientation. The cage includes at least one long shelf and at least one short shelf, both being positioned horizontally. Each shelf consists of two long parallel cylindrical rails, each having short L-shaped segments at each end. The rails have a plurality of short cylindrically shaped rods affixed therebetween in a perpendicularly intersecting orientation. The rail and rods form the boundaries of a plurality of small generally rectangular shaped apertures. The L-shaped segments are adapted to be releasably coupled with the horizontal bars of opposing sidewalls of the cage. At least one long shelf is positioned horizontally across the cage adjacent to one of the long sidewalls. At least one short shelf is positioned horizontally across the cage adjacent to one of the short sidewalls. The improvement comprises an animal cage shelf paw protector fabricated of clear acrylic plastic and made in two different lengths, a long paw protector and a short paw protector. Each paw protector is formed as a generally planar rectangular shaped panel with parallel long side edges and parallel short side edges. Each panel has an upper surface and a lower surface and is positioned horizontally in the operative orientation. The lower surface includes two parallel legs affixed thereto. The legs are formed in a generally planar rectangular configuration with parallel long side edges, parallel short side edges and a small thickness. Each leg has one of its long side edges perpendicularly intersecting the lower surface of the panel. The plane of each leg is positioned vertically between the long side edges of the panel in a perpendicular orientation. The legs are located half way between the midpoint and short side edges of the panel. The long and short paw protectors are adapted to be positioned upon the corresponding long and short shelves. The paw protectors being positioned so that the legs extend between the rods of the shelves to prevent movement of the apparatus. The solid surface of the paw protectors are adapted to prevent a small animal from injuring its paws when walking across the shelf.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved animal cage shelf paw protectors which have all the advantages of the prior art cages for birds, reptiles and other small animals and none of the disadvantages.

It is another object of the present invention to provide new and improved animal cage shelf paw protectors which may be easily and efficiently manufactured and marketed.

It is further object of the present invention to provide new and improved animal cage shelf paw protectors which are of durable and reliable constructions.

An even further object of the present invention is to provide new and improved animal cage shelf paw protectors which are susceptible of a low cost of manufacture with regard to both materials and labor, and which accordingly are then susceptible of low prices of sale to the consuming public, thereby making such animal cage shelf paw protectors economically available to the buying public.

Still yet another object of the present invention is to provide new and improved animal cage shelf paw protectors which provide in the apparatuses and methods of the prior art some of the advantages thereof, while simultaneously overcoming some of the disadvantages normally associated therewith.

Still another object of the present invention is to protect the paws of small animals by positioning the apparatus on top of the wire shelves of animal cages.

Lastly, it is an object of the present invention to provide a new and improved animal cage shelf paw protector adapted to be used in association with an animal cage of the type having a horizontal floor and four vertical sidewalls. The sidewalls consist of a plurality of vertical and horizontal bars positioned adjacent to each other and forming spaces therebetween. The floor is formed in a generally planar rectangular configuration and is positioned horizontally with the vertical sidewalls coupled thereupon. The cage includes a horizontally positioned shelf which extends from one sidewall to another. Each shelf consists of a plurality of intersecting rods. The improvement comprises an animal cage shelf paw protector fabricated of plastic and formed as a generally planar rectangular shaped panel. The panel has parallel long side edges and parallel short side edges. The panel includes an upper surface and a lower surface and is positioned horizontally in the operative orientation. The lower surface includes two generally planar legs affixed thereto. The paw protectors are adapted to be positioned upon the shelf of the cage with the legs extending between the rods to prevent movement of the apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
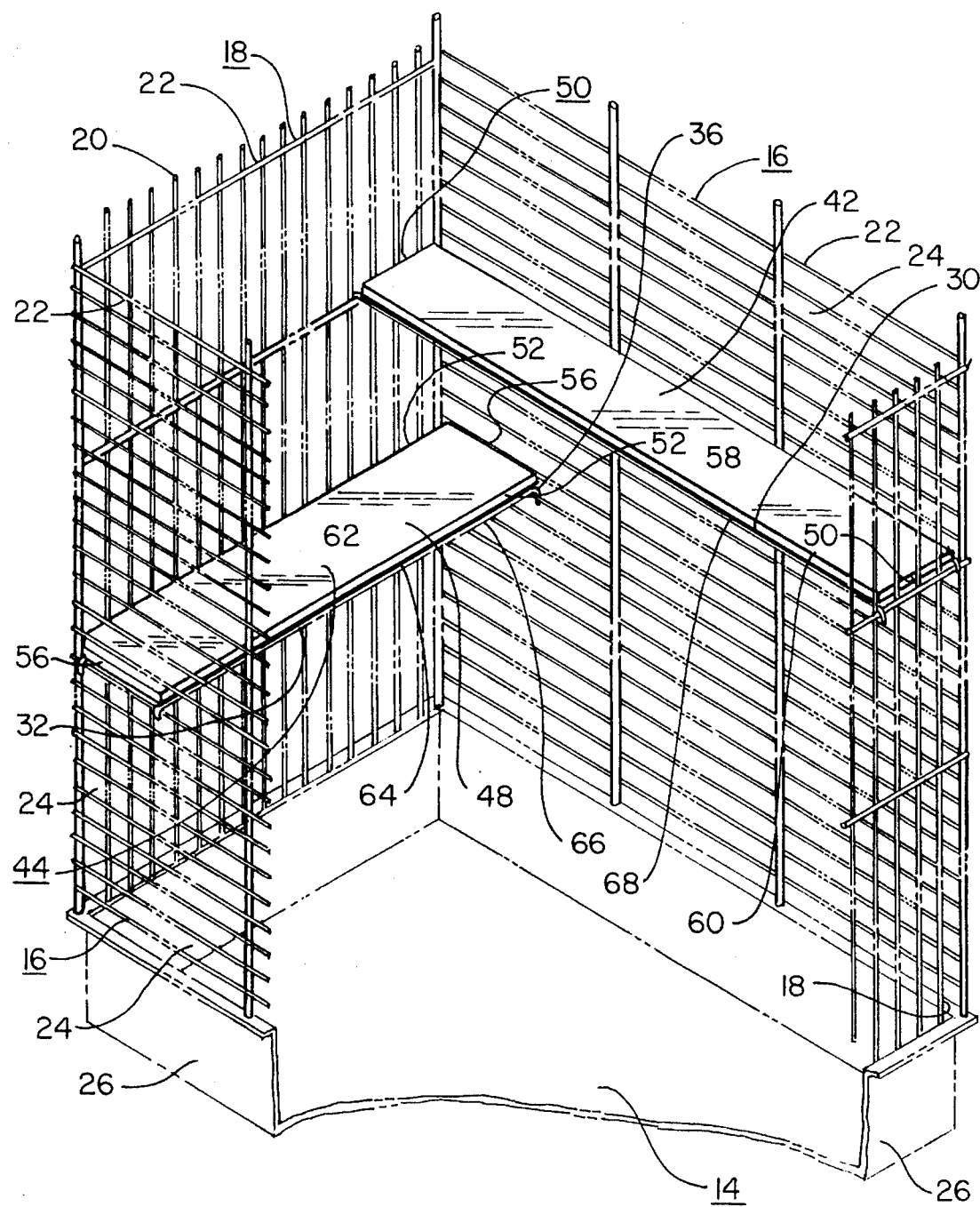
FIG. 1 is a perspective view of the preferred embodiment of the animal cage shelf paw protectors constructed in accordance with the principles of the present invention.

With reference now to the drawings, and in particular to FIG. 1 thereof, the preferred embodiment of the new and improved animal cage shelf paw protectors embodying the principles and concepts of the present invention and generally designated by the reference numeral 10 will be described.

Figure 2:
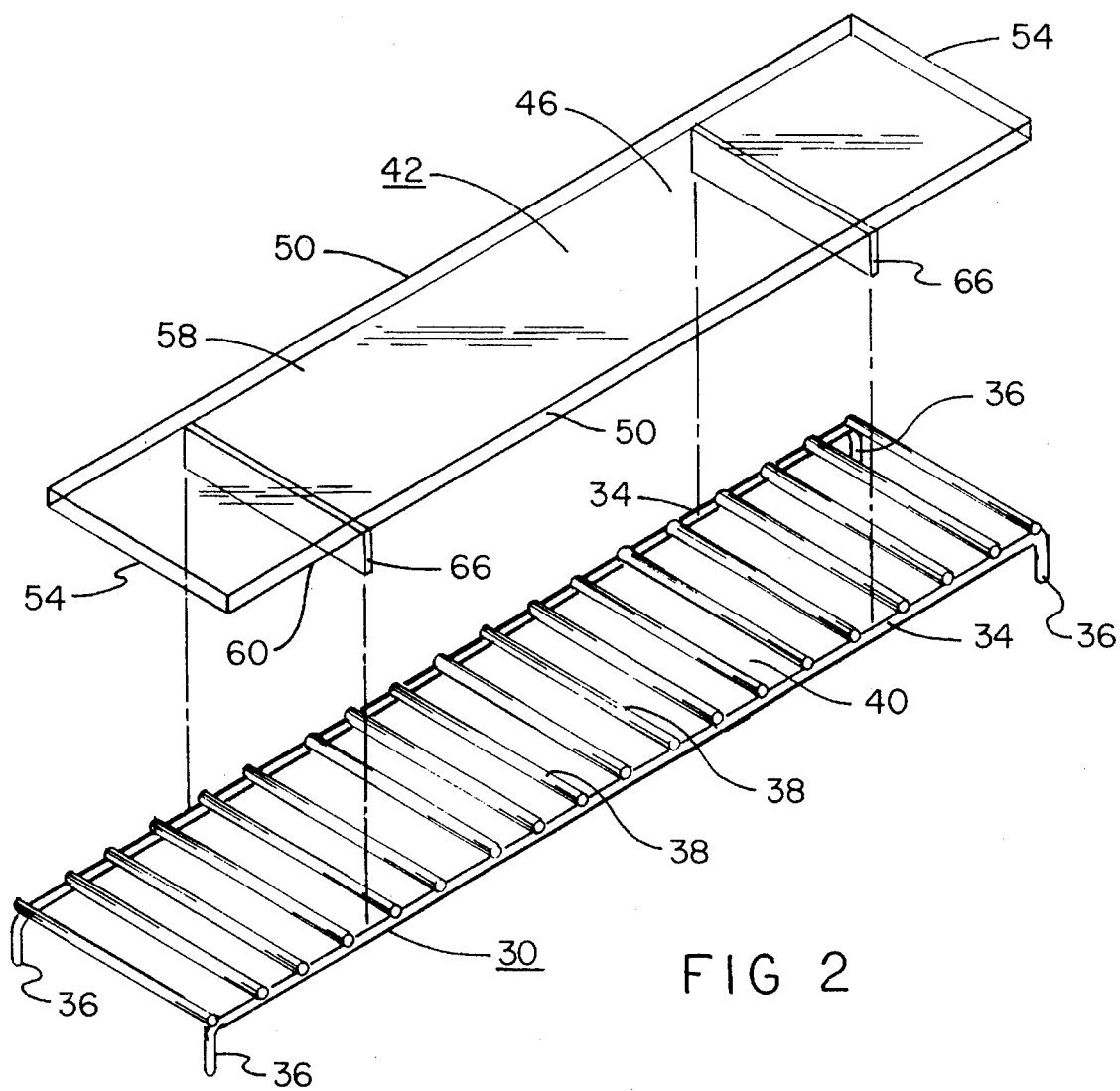
FIG. 2 is a perspective view of the paw protector illustrating its preferred positioning upon a shelf of the animal cage.
Figures 3, 4:
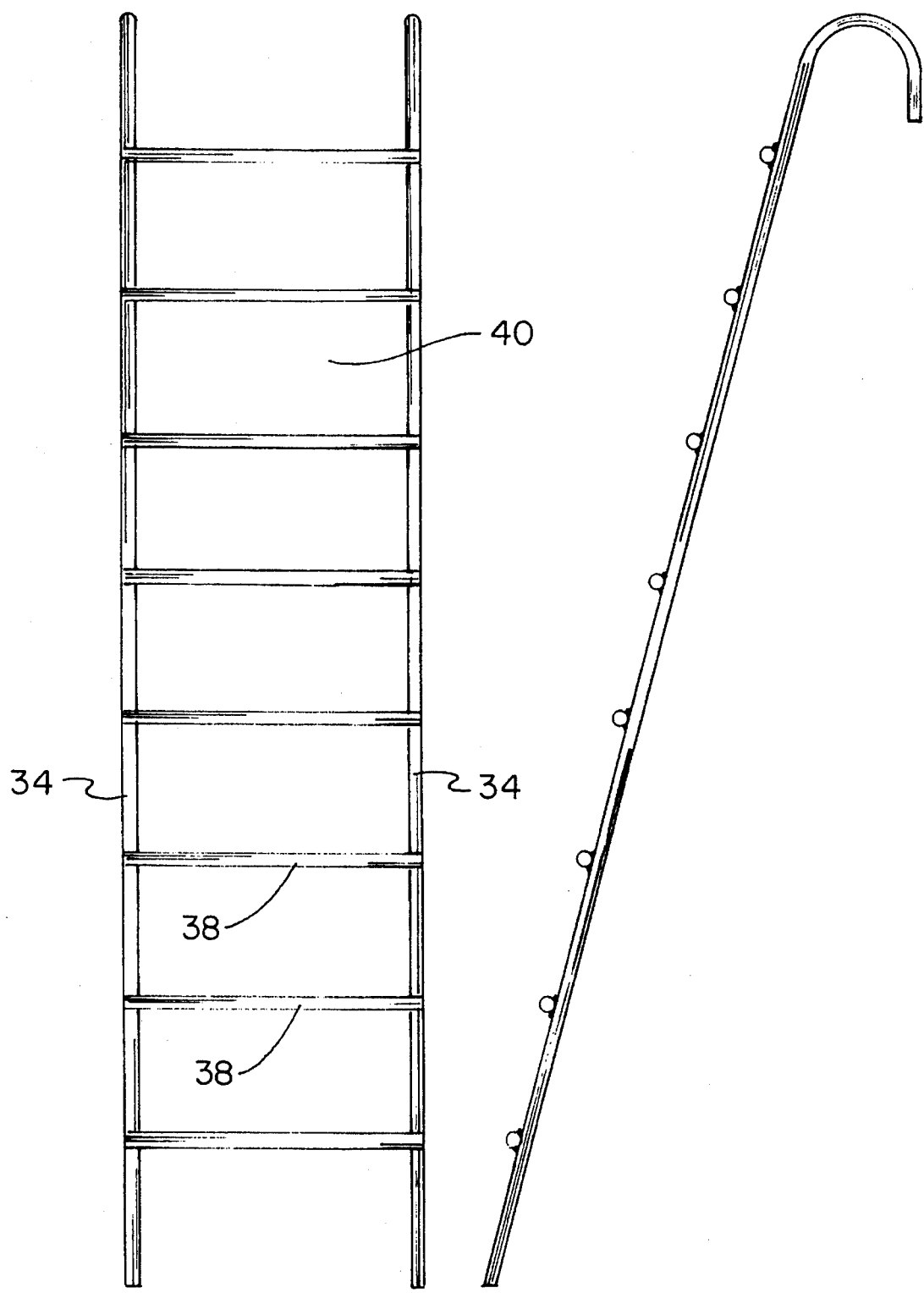
FIG. 3 is a top plan view of a shelf of the animal cage.
FIG. 4 is a side plan view of a shelf of the animal cage.
Figure 5:
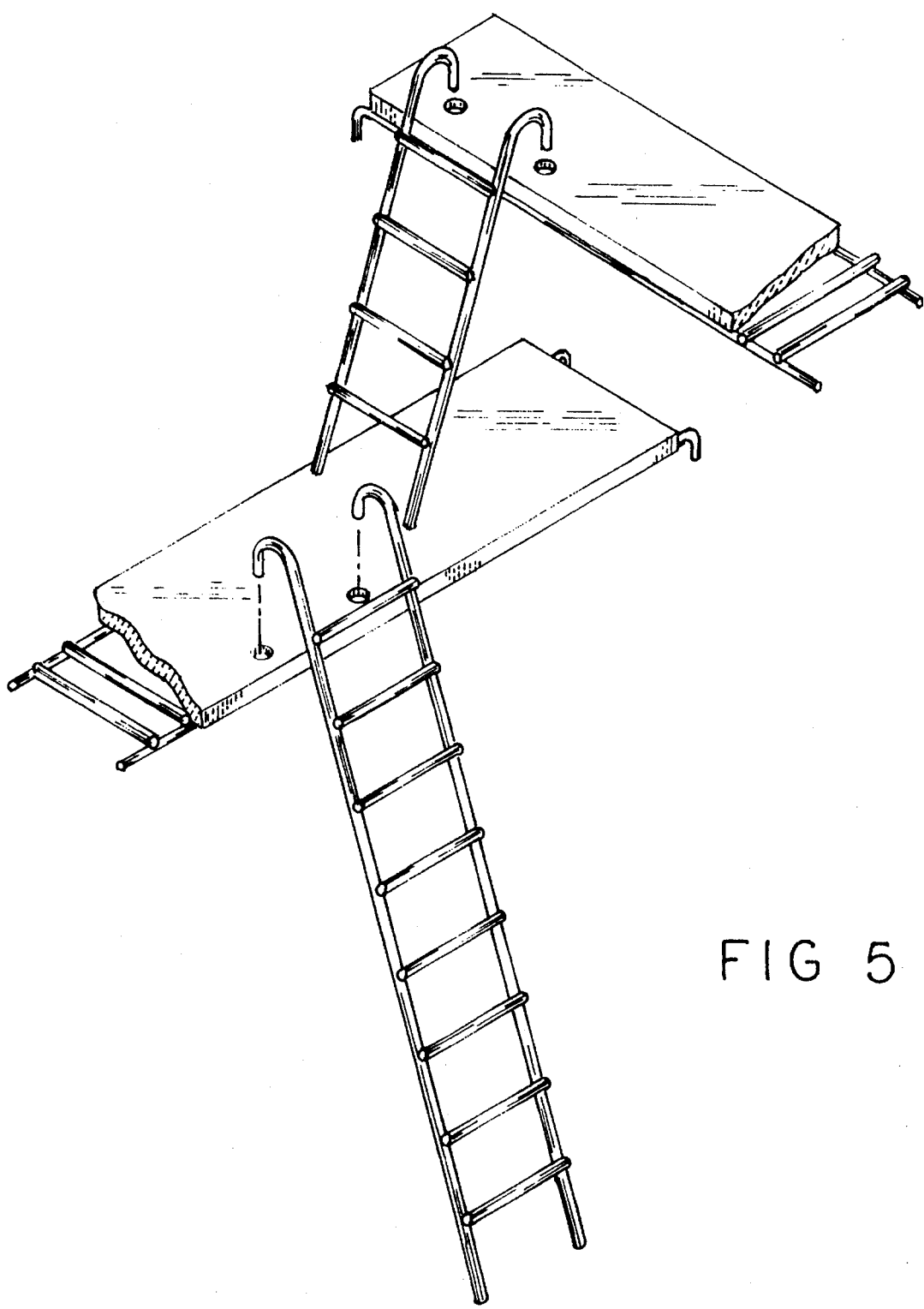

Specifically, it will be noted in FIGS. 1 through 3, that there is provided a new and improved paw protector. The animal cage shelf paw protector 10, in its broadest context, comprises two panels 46, 48, four legs 66, 68, and an animal cage 12 of the type described below to be used in association with the paw protector 10.

More specifically, the animal cage 12 is of the type having a horizontal floor 14 and four vertical sidewalls 16, 18. The cage 12 includes two opposing sidewalls having a long horizontal width 16 and two opposing sidewalls having a short horizontal width 18. The sidewalls 16, 18 consist of a plurality of equidistantly spaced, vertically 20 and horizontally 22 positioned bars. The bars 20, 22 are formed in a long thin cylindrical configuration. The bars are comprised of sturdy materials to prevent an animal from naughing through the bars and escaping from the cage. The horizontal bars 22 are affixed to the vertical bars 20 so as to form the boundaries of a plurality of small, generally rectangular shaped apertures 24. The bars are welded together to add strength and stability to the apparatus. The apertures 24 are small enough to prevent the passage of a small animal therethrough. Note FIG. 1 in particular.

The floor 14 is positioned horizontally and formed in a generally planar rectangular configuration with short vertical side plates 26 extending upward from its side edges. The side plates extend upward a sufficient distance so that pet litter and food do not fall through the bars of the cage. The vertical sidewalls 16, 18 are releasably coupled upon the uppermost extent of the side plates 26 of the floor 14 in the operative orientation. The floor is easily removable from the apparatus to facilitate cleaning by the user. Note FIG. 1.

The cage 12 includes at least one long shelf 30 and at least one short shelf 32, both being positioned horizontally. Each shelf 30, 32 consists of two long parallel cylindrical rails 34, each having short L-shaped segments 36 at each end. The rails 34 have a plurality of short cylindrically shaped rods 38 affixed therebetween in a perpendicularly intersecting orientation. The rails 34 and rods 38 form the boundaries of a plurality of small generally rectangular shaped apertures 40. The shelves are included to increase the surface area of the cage and provide recreational activity for the animal. The L-shaped segments 36 are adapted to be releasably coupled with the horizontal bars 22 of opposing sidewalls 16, 18 of the cage. At least one long shelf 30 is positioned horizontally across the cage adjacent to one of the long sidewalls 16. At least one short shelf 32 is positioned horizontally across the cage adjacent to one of the short sidewalls 18. The shelves are easily detachable from the apparatus when cleaning is required. The shelves can be placed at a variety of different vertical heights within the cage to accommodate different size animals. Note FIGS. 1, 2 and 3.

The improvement comprises an animal cage shelf paw protector fabricated of clear acrylic plastic and made in two different lengths, a long paw protector 42 and a short paw protector 44. The long paw protector has a length of about sixteen and one-half inches and the short paw protector has a length of about twelve and one-half inches. Each paw protector measures four and one-half inches wide and one-eighth of an inch thick. Note FIGS. 1 and 2.

Each paw protector 42, 44 is formed as a generally planar rectangular shaped panel 46, 48 with parallel long side edges 50, 2 and parallel short side edges 54, 56. Each panel 46, 48 has an upper surface 58, 60 and a lower surface 62, 64 and is positioned horizontally in the operative orientation. The upper surface of the apparatus has a smooth contour to provide a stable and comfortable walking surface for the animal. Note FIGS. 1 and 2.

The lower surface 62, 64 of each panel includes two parallel legs 66, 68 affixed thereto. The legs 66, 68 are formed in a generally planar rectangular configuration with parallel long side edges, parallel short side edges and a small thickness. Each leg 66, 68 has one of its long side edges perpendicularly intersecting the lower surface 62, 64 of each panel. The plane of each leg is positioned vertically between the long side edges 50, 52 of each panel in a perpendicular orientation. The legs 66, 68 are located half way between the midpoint and short side edges 54, 56 of each panel. The legs add strength and stability to the apparatus. Note FIG. 2 in particular.

The long 42 and short 44 paw protectors are adapted to be positioned upon the corresponding long 30 and short 32 shelves. The paw protectors being positioned so that the legs 66, 68 extend between the rods of the shelves to prevent movement of the apparatus 10. The surface of each leg which faces the center point of the panel firmly abuts a rod in the operative orientation. The solid surface of the paw protectors are adapted to prevent a small animal from injuring its paws when walking across the shelf. When a small animal walks across a shelf which is not covered by a paw protector, its paws sometimes develop blisters. Additionally, if the animal's leg slips through the rods while walking across the shelf, injury may occur its upper leg, lower leg or paw. Note FIGS. 1 and 2.

The animal cage shelf paw protector is designed for use in association with animal cages adapted for housing pets such as hamsters, rabbits and rats. It is a clear panel made of acrylic plastic with a thickness of about one eighth of an inch. Two perpendicularly oriented, generally planar plastic legs project from the bottom surface of the panel. The legs are used to position the panel in place when mated to a shelf of the cage. The different length panels are adapted to be coupled with an analogously sized cage shelf.

From the foregoing description, it can be seen that each of the shelves within the enclosure, the areas where a pet will spend most of its time, will thus be covered with a smooth protective surface. The alternatives are the use of a small conventional cage which simply does not have ample room for a large rodent, or the use of larger cages with elevated shelves as described above.

If one opts for the latter choice, the unprotected rods and rails which form the shelves will typically result in the creation of blisters on the paws of the pet. Further, in some cases, a paw will become entrapped between the rods and rails. The animal cage shelf paw protector addresses and eliminates these problems. The planar configuration of the legs facilitate quick installation and positive retention of the apparatus.

The apparatus can be removed equally as quickly for periodic cleaning. A prototype has been made and is currently in use, and the particular pet benefitting from this incorporation has had no problems with it.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved animal cage shelf paw protector comprising, in combination:

an animal cage having a horizontal floor and four vertical sidewalls, with two opposing sidewalls having a long horizontal width and two opposing sidewalls having a short horizontal width, the sidewalls consisting of a plurality of equidistantly spaced, vertically and horizontally positioned bars, the bars being formed in a long thin cylindrical configuration, with the horizontal bars being affixed to the vertical bars so as to form the boundaries of a plurality of small generally rectangular shaped apertures, the apertures being small enough to prevent the passage of a small animal therethrough, the floor being positioned horizontally and formed in a generally planar rectangular configuration with short vertical side plates extending upward from its side edges, the vertical sidewalls being releasably coupled upon the uppermost extent of the side plates of the floor in the operative orientation, the cage including at least one long shelf and at least one short shelf being positioned horizontally, each shelf consisting of two long parallel cylindrical rails each having short c-shaped segments at each end, the rails having a plurality of short cylindrically shaped rods affixed therebetween in a perpendicularly intersecting orientation, the rails and rods forming the boundaries of a plurality of small generally rectangular shaped apertures, the c-shaped segments being releasably coupled with the horizontal bars of opposing sidewalls of the cage, at least one long shelf being positioned horizontally across the cage adjacent to one of the long sidewalls, at least one short shelf being positioned horizontally across the cage adjacent to one of the short sidewalls;

at least two paw protectors comprised of clear acrylic plastic and fabricated in different lengths, the apparatus including at least one long paw protector and at least one short paw protector, each paw protector being formed as a generally planar rectangular shaped panel with parallel long side edges and parallel short side edges, each panel having an upper surface and a lower surface, each panel being positioned horizontally in the operative orientation, each lower surface including two parallel legs affixed thereto, the legs formed in a generally planar rectangular configuration with parallel long side edges and parallel short side edges and a small thickness, each leg having one of its long side edges perpendicularly intersecting the lower surface of the panel, the plane of the legs being positioned vertically between the long side edges of the panel in a perpendicular orientation, the legs being located half way between the midpoint and short side edges of the panel, the long and short paw protectors being positioned upon the corresponding long and short shelves with the legs extending between the rods of the shelves to prevent movement of the apparatus, the solid surface of the paw protectors preventing a small animal from injuring its paws when walking across the shelf.

\* \* \* \* \*